United States Patent [19]

Newell et al.

[11] 4,237,252

[45] Dec. 2, 1980

[54] HEAT ACTIVATABLE ONE-PART LIQUID RESIN SYSTEMS

[75] Inventors: Richard G. Newell, Woodbury; Harold E. Rude, Roseville, both of Minn.

[73] Assignee: Minnesota Mining and Manufacturing Company, St. Paul, Minn.

[21] Appl. No.: 52,848

[22] Filed: Jun. 28, 1979

[51] Int. Cl.$^3$ .................. C08G 18/16; C08G 18/58; C08G 18/32

[52] U.S. Cl. ........................... 525/454; 521/76; 528/48; 528/51; 528/52; 528/55; 528/58; 528/73

[58] Field of Search ............ 521/76; 528/48, 73, 528/51, 52, 55, 58; 525/454

[56] References Cited

U.S. PATENT DOCUMENTS

| | | | |
|---|---|---|---|
| 3,018,258 | 1/1962 | Meier et al. | 528/88 |
| 3,073,802 | 1/1963 | Windemuth et al. | 528/48 |
| 3,384,680 | 5/1968 | Lussow | 260/830 |
| 3,424,719 | 1/1969 | Masters | 528/48 |
| 3,445,436 | 5/1969 | Lake et al. | 528/48 |
| 3,505,428 | 4/1970 | Kidwell et al. | 528/48 |
| 3,516,941 | 6/1970 | Matson | 521/76 |
| 3,860,565 | 1/1975 | Barber | 521/76 |
| 4,119,565 | 10/1978 | Baatz et al. | 521/76 |

FOREIGN PATENT DOCUMENTS 1103202 2/1968 United Kingdom .
1158662 7/1969 United Kingdom .

*Primary Examiner*—H. S. Beckeram
*Attorney, Agent, or Firm*—Cruzan Alexander; Donald M. Sell; Donald C. Gipple

[57] ABSTRACT

Storage-stable, one-part, curable resin compositions comprising I. a latent catalyst which comprises rupturable microcapsules having shell walls of a crosslinked interfacial polyurethane-polyether reaction product and liquid fills of a Lewis acid-glycerol complex, II. a cationically curable monomer composition and III. a Lewis base scavenger.

13 Claims, No Drawings

HEAT ACTIVATABLE ONE-PART LIQUID RESIN SYSTEMS

BACKGROUND OF THE INVENTION

The present invention relates to storage-stable, one-part, curable resin systems containing a latent Lewis acid catalyst which can be activated by applying heat to the system.

Storage-stable, one-part, curable resin systems generally comprise two or more reactive or reaction-producing components stored in an intimately admixed, unreactive state which, ideally, react rapidly when subjected to a suitable stimulus, such as application of heat. Such systems, combining a cationically curable resin and a latent Lewis acid catalyst, would be of considerable value (since two-part systems of these constituents cure rapidly to form strong bonds and have other properties which are valuable in particular uses, e.g. in some cases curing without the release of volatiles). Various attempts have indeed been made to prepare one-part systems from these and similar constituents, for example by adsorbing the catalyst into a carrier, by encapsulating or otherwise shielding it from the curable resins until released by the action of heat or pressure, etc. However, these attempts (of which British Pat. No. 1,103,202; British Pat. No. 1,158,662 and U.S. Pat. No. 3,018,258 are illustrative) have met with only limited success due largely to difficulties in combining suitable stability prior to activation, speed of reaction after activation and overall adhesive properties.

THE PRESENT INVENTION

The storage-stable, curable, one-part liquid resin systems of the present invention contain dispersed therein microcapsules of a Lewis acid-polyhydric alcohol (preferably glycerol) complex encapsulated within shell walls of a crosslinked interfacial polycondensation product of an aromatic polyisocyanate, glycerol and a cycloaliphatic epoxide.

The microcapsules, upon application of heat to the one-part system, release the Lewis acid catalyst and initiate curing. These systems provide a unique combination of storage stability and speed of reactivity upon activation with excellent mechanical properties of the cured resin, thus rendering them very valuable in a variety of use areas.

The curable systems can also be activated by solvent action, although the ability to be activated by heat is their distinctive characteristic. The speed and manner of cure can be controlled by the design of the system.

The heat curable, one-part, liquid resin systems of the invention comprise:

I. a latent catalyst which comprises a slurry of
  A. rupturable, impermeable microcapsules ranging in size from about 0.1 to 20 microns having
    (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and
    (2) liquid fills comprising a Lewis acid-glycerol complex, and
  B. a liquid medium selected from aromatic polyisocyanates as defined above and esters of an aromatic carboxylic acid and an alkyl, aralkyl or aryl alcohol, the ester containing up to about 40 carbon atoms, II. a cationically curable monomer system, and III. a Lewis base scavenger having a $pK_b$ of from about 6 to 11, there being from 1 to 40 parts of I and 60 to 99 parts of II in the one-part system, the sum of I and II being 100 parts, and there being 0.1 to 35 mole percent of III, based on the moles of Lewis acid in the microcapsules. Ordinarily the microcapsules themselves make up no more than 20 parts in these systems and the remainder (if any) of the latent catalyst is made up by a liquid medium as described hereinafter.

The microcapsules are prepared in liquid media and the resulting latent catalyst concentrates (slurries) are ordinarily added directly to the cationically curable resin systems. This eliminates the necessity of separating the microcapsules from the encapsulation medium and effects further economy. However, the microcapsules can, if desired, be separated from the medium and mixed into a different liquid medium prior to use or they can be mixed directly into a resin system to be catalyzed or into a component thereof.

The microencapsulation process involves the formation of a shell wall utilizing the interfacial polycondensation products of a cycloaliphatic epoxy resin, glycerol and an aromatic polyisocyanate on the surface of a droplet of catalyst in either a potentially reactive or non-reactive microencapsulation medium (as those terms are explained hereinafter). More specifically it comprises (a) dispersing and maintaining discrete droplets of a Lewis acid-polyhydric alcohol (glycerol) complex in a liquid medium selected from aromatic polyisocyanates having an equivalent weight of up to about 380 and a functionality of from about 2 to 6 and esters of an aromatic carboxylic acid and an alkyl, aralkyl or aryl alcohol, the ester containing up to about 40 carbon atoms, and (b) adding to said liquid medium a composition comprising an aromatic polyisocyanate as defined above and a cycloaliphatic polyepoxide having an equivalent weight of from about 70 to 220 and a functionality of from about 2 to 3.

Interfacial polycondensation occurs at the droplet surfaces to form a slurry of rupturable microcapsules having shell walls of a crosslinked interfacial polyurethane-polyether reaction product of the aromatic polyisocyanate, glycerol and the cycloaliphatic polyepoxide and liquid fills comprising the Lewis acid-alcohol complex.

The resulting concentrates normally (and preferably) contain from about 1 to 50 parts (by weight) of A, the microcapsules, and 50 to 99 parts of B, the liquid medium, the sum of A and B being 100 parts. A more preferred class are those concentrates which contain from about 10 to 40 parts of the microcapsules and 60 to 90 parts of the liquid medium (the sum of the two being 100 parts).

The microcapsules are preferably the reaction products of (a) 5–25 parts of the Lewis acid,
(b) 5–30 parts of the aromatic polyisocyanate,
(c) 5–20 parts of the cycloaliphatic polyepoxide and
(d) 25–75 parts of glycerol, the sum of (a), (b), (c) and (d) in the microcapsules being 100 parts.

A stabilizer in the form of a scavenger for any catalyst remaining unencapsulated is normally added after the encapsulation, or it can be added later, e.g. before the capsule concentrate is mixed with the curable resin.

Catalysts suitable for use in the microcapsules are well known to the art and include Lewis acids and Lewis acid-derived Brönsted acids, for example $BF_3$, $SnCl_4$, $SbCl_5$, $SbF_5$, $PF_5$, $HBF_4$, $HPF_6$ and $HSbF_6$. These compounds are all referred to herein, for convenience, as Lewis acids. They are complexed with the polyhydric alcohol in order to form a liquid catalyst material which can be readily handled and effectively utilized in the microencapsulation process (the term "complex", when used herein, includes any chemical reaction products which may be present). This liquid is relatively insoluble in the medium under the conditions of encapsulation (i.e. will form droplets when dispersed therein).

The preferred polyhydric alcohol, glycerol, is hydroscopic and, as used, normally contains a minor amount of water, e.g. 0.1 to 5 percent, although it can contain up to 50 percent of water. The amounts of the polyhydric alcohol (glycerol) as given herein include this water. An excess of the glycerol is ordinarily used (over that required to complex with the Lewis acid), and some of the free hydroxyl groups at the surface of the droplets are believed to react with the shell wall components during encapsulation and thereby participate in the formation of the shell walls. When released from the capsules dispersed in a cationically-curable resin, the glycerol will mix with the resin and participate in its polymerization.

The liquid medium in which the encapsulation takes place must be chosen so that its characteristics relate suitably to those of the other materials present during encapsulation as well as those of the resin into which the capsules are to be dispersed. Thus the relative viscosities, solubilities and surface tension properties of the encapsulation medium and the fill material are important factors in forming an adequate suspension of the fill material in the encapsulation medium with droplets of the desired size. The size of the droplets of fill material will determine the ultimate size of the microcapsules. It appears, furthermore, that the partition coefficient of the shell wall components between the encapsulation medium and the fill material are important to the formation of functionally impermeable shell walls, i.e. which effectively isolate the liquid fill under conditions of storage. Finally, the encapsulation medium must be compatible with the cationically polymerizable resin to be catalyzed since the microcapsules are generally introduced into it as a concentrate of capsules in the encapsulating medium.

The aromatic polyisocyanate encapsulation media take part in the encapsulation reaction itself and are subsequently reactive with one or more components of the one-part curable systems under curing conditions. Hence, they are often referred to herein as reactive media. The ester encapsulation media do not take part in the encapsulation and they do not react subsequently, e.g. during curing of any cationically curable resin system into which the capsule-medium slurry is mixed. Hence, they are often referred to herein as non-reactive media. Of course, neither type of medium is reactive in a cationically curable system under conditions of storage (while the microcapsules remain intact).

Representative of the aromatic polyisocyanates which are suitable for use in the present invention are m-phenylene diisocyanate, mixtures of toluene-2,4-diisocyanate and toluene-2,6-diisocyanate, diphenyl-3,3'-dimethyl-4,4'-diisocyanate, diphenyl-3,3'-dimethoxy-4,4'-diisocyanate, diphenylmethane-4,4'-diisocyanate, diphenylmethane-4,4'-dimethyl-3,3'-diisocyanate and 1,5-naphthalene diisocyanate. The so-called polymeric aromatic polyisocyanates, such as those obtained by phosgenation of polyamines and by condensing formaldehyde with aromatic amines, can also be used. The commercially available products of these types are often mixtures of materials containing minor proportions of molecules having equivalent weights and functionalities outside the limits set hereinabove and which might, in pure form, even be solids at ordinary temperatures. However, such products are referred to herein (as is customary) in terms of averages of equivalent weight and functionality and are suitable for use in the present invention. Particularly useful polyphenyl polyisocyanates have an average of from about 2 to 2.8 isocyanate groups per molecule such as those sold commercially under the trade designations "Mondur" MR and MRS (available from the Mobay Company) and "PAPI 901" (available from the Upjohn Company).

The non-reactive (ester) encapsulation media are preferably the phthalate and trimellitate esters of alkyl or arylalkyl alcohols having from 1 to 20 carbon atoms, for example dimethyl phthalate, diethyl phthalate, dibutyl phthalate, dioctyl phthalate, butylbenzyl phthalate and tri-(α-ethylhexyl)trimellitate. Butylbenzyl phthalate and tri-(α-ethylhexyl)trimellitate are the presently preferred non-reactive encapsulation media.

Exemplary of the cycloaliphatic polyepoxides which are suitable as shell wall components are difunctional compounds such as vinylcyclohexenedioxide, 3,4-epoxycyclohexylmethyl 3,4-epoxycyclohexanecarboxylate and bis(3,4-epoxy-6-methylcyclohexylmethyl) adipate. These are available from the Union Carbide and Carbon Corp. under the trade designations "ERL 4206", "ERL 4221" and "ERL 4289", respectively.

The preferred shell wall-forming ingredients are glycerol, "ERL 4221" and "Mondur MRS".

By the proper choice of constituents (particularly the encapsulation medium) and stirring conditions, the size ranges of droplets of the glycerol catalyst complex can be varied. The size of the droplets of catalyst in the encapsulation medium is also affected by the temperature of the system. The lower the temperature the smaller are the droplets for a given shear system. This temperature effect can, for example, be achieved with a non-reactive medium (such as tri(α-ethylhexyl)trimellitate or butylbenzyl phthalate). Thus, droplet sizes of 1-10 microns can be obtained with high speed stirring and cooling to 0° to 10° C. while larger droplets result from lower speed stirring and higher temperatures. Addition of shell wall-forming materials then results in capsules approximating the size of the droplets.

When a polyisocyanate is used as the encapsulation medium, rapid stirring of the components will provide droplets of catalyst complex or solution in the range of 0.1-20 microns while slower stirring will yield larger droplets.

Various types of conventional stirring apparatus can be used. Home food blenders as well as laboratory stirrers and blenders can be used depending upon the size of droplet required. The speed required to form droplets of a given size is a function of the type of stirrer blade used, the configuration of the container and the amount of material to be dispersed.

The optimum rate of addition of the shell wall-forming components to the stirred dispersion of the catalyst complex in the encapsulation medium is a function of the encapsulation medium that is being employed. If a non-reactive encapsulation medium is being used, the shell wall formation is slower and better quality capsules are obtained if the shell wall components are added at a relatively slow rate, e.g. 30 to 60 minutes for a typical laboratory-size preparation. Complete capsule formation in such a case may require from 10 to 18 hours. If a reactive encapsulation medium (such as a polyisocyanate) is used, a rapid addition of the wall-forming components yields good microcapsules since shell wall formation is also very rapid. Thus, with a reactive encapsulation medium the shell wall-forming components may be added over a time period of about 30–120 seconds or more for a typical laboratory-size batch (e.g. 1 kilogram).

The encapsulation process is generally carried out at temperatures ranging from about 0° to 40° C. Due to the speed of capsule formation with a reactive encapsulation medium, a considerable amount of heat is generated within a short time. If the temperature of the system is permitted to rise above 40° C., polymerization of the encapsulation medium can result and cooling may be necessary. Preferably the temperature of the system during the microencapsulation procedure should remain below about 30° C.

The capsule concentrate (the capsules in the encapsulation medium) is ready for use as soon as the encapsulation process is completed. Ordinarily and preferably no medium is removed. If a reactive medium has been used, it reacts to become part of the final resin product, and it must be considered in the material balance of the constituents to assure that substantially complete reaction of the reactive species is ultimately achieved. If a non-reactive medium has been used, it serves as a plasticizer in the final resin product. The concentrate generally contains from about 1 to 10 percent by weight of the Lewis acid catalyst.

During the encapsulation process a small proportion of the catalyst complex ordinarily becomes entrained in the encapsulation medium, thereby escaping encapsulation. Removal of this free catalyst is necessary in order to prevent premature curing of the cationically polymerizable resin system to which it is ultimately added. This is accomplished by adding a Lewis base which is strong enough to complex the acid catalyst and prevent curing of the cationically polymerizable resin, but which is not a strong enough base to effect the polymerization of the resin itself. Lewis bases having a $pK_b$ of about 6–11 have been found to be satisfactory. These scavenger materials can be added to either the capsule concentrate or to the curable resin upon preparing the one-part system. The amount of scavenger needed is generally between about 0.1 and 35 mole percent (based upon the number of moles of catalyst present). Preferably about 6–12 mole percent of the scavenger is used with a non-reactive encapsulation medium and about 1–4 mole percent thereof with a reactive medium.

Suitable scavengers include the following: dimethylformamide, dibutylformamide, 2,6-lutidine, 2,5-diacetylimidazole, 3-benzoylpyridine, acridine, 1,1'-carbonyldiimidazole, methyl nicotinate, 2,7-dimethylquinoline, 1,2,4-trimethylpiperazine, 2,5-dimethylpyrazine, 4-pyridine carboxaldehyde, 3-acetylpyridine, quinoline, 2,4,6-trimethylpyridine, methyl isonicotinate, acetonitrile and dimethylsulfoxide. The preferred scavengers for the phthalate ester system are 2,6-lutidine, acridine, methyl isonicotinate and 1,1'-carbonyldiimidazole. The preferred scavengers for the isocyanate system are dimethylformamide, methyl isonicotinate, acridine and 1,1'-carbonyldiimidazole.

Substantially complete capsule rupture or dissolution can be achieved by heat or by solvents. Any solvent which disrupts the continuity of the shell wall will activate the one-part curable systems, e.g. polar solvents like low molecular weight alcohols and acetone.

The cationically polymerizable monomers (this term includes prepolymers, resins, etc.) which can be used in the one-part curable systems are exemplified by liquid acetals, aziridines, epoxides, ethylenically unsaturated hydrocarbons, N-vinyl compounds, vinyl ethers and, if desired, mixtures thereof. These will often be referred to herein for convenience as monomers. The monomers preferred for use in this invention are the epoxides, although the other cationically polymerizable monomers are useful and can be used as additives to the epoxy systems. The most suitable epoxy materials are resins having an epoxide equivalent number of 2.0 or greater. Included are bisphenol A-based epoxy resins such as bisphenol A diglycidyl ether, bisphenol F diglycidyl ether, aliphatic epoxides, cycloaliphatic epoxides, epoxy novolak and heterocyclic-type epoxy resins. These should be substantially free of hydroxyl groups if they are to be used with a capsule concentrate containing a polyisocyanate resin, since the isocyanate groups will react with hydroxyl groups to form urethanes. In some instances a small amount of hydroxyl functionality may be useful since the reaction of the isocyanate group with the hydroxyl group will cause an increase in viscosity and this mechanism can be used as a means by which the viscosity of the final one-part systems may be regulated.

The specific amount of the constituents of the one-part systems (the catalyst I, the monomers II and the scavengers III) are carefully balanced. Thus, the effective amount of catalyst present is reduced by the amount of the free scavenger present. Also, when the microcapsules are added to a suitable resin (such as an epoxy resin), strict attention must be paid to the amount of hydroxyl functionality present in the resin (particularly when a polyisocyanate encapsulation medium is used to prepare the capsules therein) since the hydroxyl groups could react with free isocyanate groups to form urethane linkages and cause unwanted viscosity increases in the system. Pure bisphenol A and bisphenol F diglycidyl ethers are relatively free of hydroxyl functionality.

Various additives, including fillers, plasticizers and reactive diluents can be used with the one-part, curable systems to modify their properties and render them more suitable for particular end uses. Fillers and plasticizers can ordinarily be added to systems in which the microcapsules are prepared using a reactive encapsulation medium, but reactive diluents must be added with care. Any material which does not dissolve the shell wall may ordinarily be added to the one-part systems based on the microcapsules prepared in the phthalate esters. Suitable fillers may be powdered, granular, particulate or fibrous and include clay, talc, glass beads or bubbles, glass fibers, mineral powders, mineral particles, metal powders, titanium dioxide, silicon carbide, carbon black, mica, silica, sand, mineral fibers and the like. They may be added in amounts ranging from 1 to 95 percent. The phthalate esters used as non-reactive encapsulation media are examples of plasticizers.

The reactive diluents, referred to previously, are added, for example, to obtain faster cure times and to modify the properties of the cured polymer. The reactivity of the diluent also often governs the gel time and affects the latency of the sample. They may include hydroxyl-terminated tackifiers, long-chain polyols, polyesters, polyurethanes, anhydrides, polyisocyanates (including aromatic, cycloaliphatic and aliphatic polyisocyanates), phenylglycidyl ether, decylglycidyl ether, the glycidyl ester of a tertiary $C_9$-$C_{11}$ carboxylic acid (available from the Shell Chemical Corp. under the trade designation "Cardura E Ester"), the butyl ester of epoxidized linseed oil (available from Swift Chemicals under the trade designation "Epoxol 8-2B"), beta- or gamma-butyrolactone, styrene, D-limonene, dioxane, trioxane and the like. The reactive diluents may be added in amounts of up to about 50 percent based upon the total weight of the system, e.g. from about 1 to 100 parts of the reactive diluent based on 100 parts of the catalyst (I) together with the monomer system (II).

In order to promote reactivity of the isocyanate resin into the polymer in the heat-curable, one-part epoxy compositions in which the microcapsules have been prepared in a reactive polyisocyanate medium, urethane catalysts may be added to the system. Examples of urethane catalysts are stannous octoate, diacetoxydibutyltin, dibutyltindilaurate, lead naphthanate and phenylmercury oleate. Since there is no unencapsulated hydroxyl functionality present in such systems, they exhibit good shelf stability even with urethane catalysts present. The urethane catalyst can be present to the extent of about 0.05 to 0.5 percent based on the total weight of the system.

The latent, one-part epoxy formulations made utilizing catalysts of the present invention are useful in many applications where epoxy resins are currently being employed. In particular, they are useful as adhesives. They cure rapidly upon application of heat and no solvents are emitted. Since the polymerization catalyst is already distributed throughout the resin, there is no need for costly and complicated two-part meter mix equipment. Finally, these one-part epoxy systems have excellent shelf stability at room temperature. The following is a specific preferred type of the one-part systems of the invention:

(1) One-part heat curable compositions of I. 5–40 parts of a latent catalyst concentrate comprising a slurry of 1–5 micron microcapsules in an aromatic polyisocyanate medium, II. 60–95 parts of an epoxy resin and III. a Lewis base scavenger having a $pK_b$ from about 6 to 11, the sum of I and II being 100 parts and there being 0.1 to 35 mole percent of III based on the moles of Lewis acid in the microcapsules with one or more reactive diluents being optionally included. Hard, bubble-free castings having high tensile strengths and low percentage elongation values can be prepared from them.

(2) One-part heat curable compositions of I. 10–30 parts of catalyst concentrate, II. 70–90 parts of a cationically curable monomer system consisting of 40–80 parts of bisphenol A diglycidyl ether, 5–30 parts of a polyisocyanate reactive diluent and 5–30 parts of a second reactive diluent and III. the scavenger, the sum of I and II being 100 parts. The preferred capsule concentrate uses 20 percent $BF_3$-glycerol as the microcapsule fill material, has an overall $BF_3$ concentration of 4 weight percent and contains 2.0–2.5 mole percent of dimethylformamide, based on the moles of $BF_3$ present.

The following non-limiting examples will further illustrate the practice of the invention. Unless otherwise indicated, all parts, proportions and percentages (in the examples and throughout the specification and claims) are by weight, and all viscosities are measured using a Brookfield viscometer.

The gel times reported in the examples are run at specific elevated temperatures (e.g. 150° C.). A drop of the one-part system to be tested is placed on a glass cover slip which is being heated to the appropriate temperature by a Kofler Heizbank gradient temperature heating bar. The time required for the droplet to gel completely is recorded. Also, unless otherwise indicated, the gel times are determined on freshly prepared (not aged) samples.

Certain products utilized frequently in the examples are referred to therein for convenience by short descriptive phrases identified as follows:

Polyisocyanate I. A polymethylenepolyphenylisocyanate having a molecular weight of about 380 and an average isocyanate equivalent weight of 133 (thus containing about 2.6 isocyanate groups per molecule) available from the Mobay Company under the trade designation "Mondur MRS".

Polyisocyanate II. A polyfunctional aliphatic isocyanate having an average isocyanate equivalent weight of 195, available from the Mobay Company under the trade designation "Desmodur N-100".

Cycloaliphatic polyepoxide I. 3,4-Epoxycyclohexylmethyl 3,4-epoxycyclohexanecarboxylate having the formula

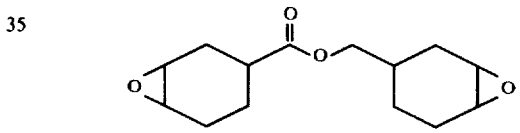

available from the Union Carbide and Carbon Corporation under the trade designation "ERL 4221".

Epoxy resin I. Bisphenol A diglycidyl ether, available commercially from the Dow Chemical Company under the trade designation "DER 332".

Epoxy resin II. Bisphenol A diglycidyl ether, available commercially from the Celanese Coatings and Specialties Company under the trade designation "Epi-Rez 508".

Epoxy resin III. A hydantoin-based diepoxide of the formula

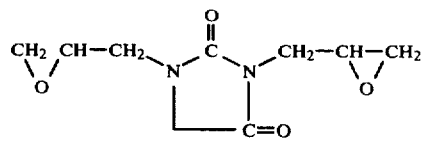

which is available commercially from Ciba-Geigy under the trade designation "XB-2793".

Epoxy resin IV. Epoxidized linoleic acid dimer, available commercially from the Shell Chemical Corporation under the trade designation "EPON-871".

Reactive diluent I. The glycidyl ester of a tertiary $C_9$-$C_{11}$ carboxylic acid which is available commercially from the Shell Chemical Corporation under the trade designation "Cardura E Ester".

Reactive diluent II. The butyl ester of epoxidized linseed oil, available commercially from Swift Chemicals under the trade designation "Epoxol 8-2B".

Reactive diluent III. "Nadic" methyl anhydride having the formula

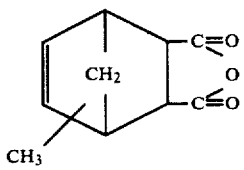

PREPARATION OF THE LATENT CATALYSTS
(Examples 1-3)

EXAMPLE 1

In reactive medium—capsule size 1-5μ.

One hundred parts of boron trifluoride gas is bubbled directly into 400 parts of glycerol over a 30 minute period with cooling from an ice bath to keep the temperature from exceeding 70° C. to give a 20 percent $BF_3$-glycerol complex. Polyisocyanate I (735 parts) is placed in a stainless steel beaker, cooled to 7°-10° C. in an ice bath and 210 parts of the 20 percent $BF_3$-glycerol complex is dispersed therein with stirring. The stirring apparatus is a Premier Dispersator unit type DD with a 2½ inch diameter (approximately 6.4 cm.) Waring Blendor blade rotating at 4000 rpm. The resulting droplet size range is 1-5μ. A 50:50 solution of polyisocyanate I and cycloaliphatic polyepoxide I (105 parts) is added over a two minute period while maintaining the agitation and cooling (to minimize the temperature rise resulting from the exotherm). The mixture is then stirred less vigorously (2000 rpm) until the temperature drops to 17° C., dimethylformamide (1.05 parts) is added with continual stirring and the mixture is degassed. The resulting capsule concentrate contains 4 percent $BF_3$ catalyst and 2.4 mole percent of dimethylformamide scavenger (based on moles of $BF_3$).

EXAMPLE 2

In reactive medium—with a different Lewis acid.

Capsules are prepared using the procedure and amounts of Example 1., except using a 20 percent antimony pentafluoride-glycerol complex in place of a boron trifluoride-glycerol complex and using 2,6-lutidine (1.54 parts) in place of the dimethylformamide. The resulting capsule concentrate contains 4 percent $SbF_5$ catalyst and 7.4 mole percent of 2,6-lutidine (based on the moles of catalyst).

EXAMPLE 3

In non-reactive medium—capsule size 1-10μ.

Tri-(α-ethylhexyl)trimellitate (66.7 parts) is cooled to 10° C. and stirred at 5000 rpm using the stirring apparatus in Example 1. 20 Percent $BF_3$-glycerol (20 parts) is added and stirred until 1-10μ droplets are obtained. A 50/25/25 solution of cycloaliphatic epoxide I, tri-(α-ethylhexyl)trimellite and toluene-2,4-diisocyanate (13.3 parts) is then added over a 1 to 2 minute period. The resulting mixture is stirred for 30 minutes to give a capsule concentrate which contains 4 percent $BF_3$ catalyst.

ONE-PART, HEAT-CURABLE SYSTEMS CONTAINING THE LATENT CATALYSTS
(Examples 4-8)

EXAMPLE 4

Containing various latent catalysts and encapsulating media.

One-part, heat-curable systems are prepared using the 4 percent $BF_3$ capsule concentrate from Example 1 and epoxy resin III, a hydantoin-based epoxy resin. Data on three such systems, including stability prior to activation and speed of reaction upon activation (gel time) are as follows:

TABLE I

| Lot | Resin Formulation | Initial Viscosity (cps) | Viscosity of Aged Sample (cps) | Age of Sample (days) | Gel Time (sec/°C.) |
|---|---|---|---|---|---|
| A | 90 parts Epoxy Resin III<br>10 parts 4% $BF_3$ Capsule Concentrate | 2,250 | 10,600 | 17 | 195/150 |
| B | 80 parts Epoxy Resin III<br>10 parts Polyisocyanate I<br>10 parts 4% $BF_3$ Capsule Concentrate | 2,000 | 31,000 | 17 | 120/150 |
| C | 80 parts Epoxy Resin III<br>5 parts Polyisocyanate I<br>15 parts 4% $BF_3$ Capsule Concentrate | 2,350 | 40,500 | 17 | 95/150 |

Using 4 percent $SbF_5$ capsule concentrate from Example 2, one-part, curable epoxies are prepared and tested for stability prior to activation and for speed of reaction upon activation with the following results:

TABLE II

| Lot | Formulation | Viscosity at 4 days (cps) | Viscosity of Aged Sample (cps) | Age of Sample (days) | Gel Time (sec/°C.) |
|---|---|---|---|---|---|
| D | 50 parts Epoxy Resin I<br>10 parts Reactive Diluent II<br>25 parts Polyisocyanate I<br>15 parts 4% $SbF_5$ Capsule Concentrate | 6,350 | 53,500 | 119 | 73/150 |
| E | 60 parts Epoxy Resin I<br>20 parts Reactive Diluent II<br>10 parts Polyisocyanate I<br>10 parts 4% $SbF_5$ Capsule Concentrate | 7,900 | 77,000 | 119 | 46/150 |

Utilizing the capsule concentrate prepared in Example 3, one-part, heat-curable systems are prepared. Shown below in Table III are the formulations and data collected on these compositions.

TABLE III

| Lot | Formulation | Initial Viscosity (cps) | Viscosity of Aged Sample (cps) | Age of Sample (days) | Initial Gel Time (sec/°C.) |
|---|---|---|---|---|---|
| F | 75 parts Epoxy Resin I<br>10 parts Cycloaliphatic polyepoxide I<br>0.14 part Methyl Isonicotinate<br>15 parts 4% $BF_3$ Capsule Concentrate (Example 3) | 6,100 | 8,200 | 10 | 8/150 |
| G | 75 parts Epoxy Resin I<br>10 parts 1000 M.W. Polypropyleneglycol<br>0.14 part Methyl Isonicotinate<br>15 parts 4% $BF_3$ Capsule Concentrate (Example 3) | 5,500 | 6,800 | 9 | 5/150 |

EXAMPLE 5

With various reactive diluents.

Latent, one-part, heat-curable epoxy systems are formulated by mixing 50 parts of epoxy resin I, 15 parts of the 4 percent $BF_3$ capsule concentrate of Example 1, 25 parts of polyisocyanate I and 10 parts of a reactive diluent. Table IV lists these reactive diluents, gel time and aging study data.

TABLE IV

| Lot | Reactive Diluent | Initial Viscosity (cps) | Viscosity of Aged Sample (cps) | Age of Sample (days) | Gel Time of Aged Samples (sec/°C.) |
|---|---|---|---|---|---|
| A | No. I | 1,000 | 6,800 | 216 | 31/150 |
| B | Phenyl glycidyl ether | 1,500 | 3,700 | 200 | 30/150 |
| C | Styrene | 250 | 25,000 | 65 | 5/150 |
| D | Styrene | 250 | 150,000 | 129 | 7/150 |
| E | D-limonene | 6,100 | 37,500 | 129 | 20/150 |
| F | No. II | 1,700 | 38,500 | 119 | 28/150 |
| G | γ-Butyrolactone | 750 | 13,400 | 60 | 3/150 |
| H | γ-Butyrolactone | 750 | 100,000 | 133 | 32/150 |
| I | No. III | 1,750 | 66,500 | 64 | 3/150 |
| J | No. III | 1,750 | >100,000 | 129 | — |
| K | The triglycidyl ether of trimethylolpropane | 2,000 | 27,500 | 13 | 30/150 |
| L | The triglycidyl ether of trimethylolpropane | 2,000 | >100,000 | 28 | — |

EXAMPLE 6

With various proportions of components and reactive diluents.

The capsule concentrate of Example 1 is used in the formulations of this example. The resulting viscosity and gel time tests (Table V) show that the more polyisocyanate present is a given system, the less its reactivity and the greater its stability.

TABLE V

| Lot | Formulation | Age of Sample (days) | Viscosity (cps) | Gel Time of Aged Samples (sec/°C.) |
|---|---|---|---|---|
| A | 50 parts Epoxy Resin II<br>10 parts Styrene<br>25 parts Polyisocyanate I<br>15 parts Capsule Concentrate | 0<br><br>21 | 300<br><br>440 | 10/80<br><br>140/100 |
| B | 55 parts Epoxy Resin II<br>10 parts Styrene<br>20 parts Polyisocyanate I<br>15 parts Capsule Concentrate | 0<br><br>21 | 300<br><br>975 | 10/80<br><br>93/100 |
| C | 60 parts Epoxy Resin II<br>10 parts Styrene<br>15 parts Polyisocyanate I<br>15 parts Capsule Concentrate | 0<br><br>21 | 350<br><br>37,500 | 10/80<br><br>35/100 |
| D | 65 parts Epoxy Resin II<br>10 parts Styrene<br>10 parts Polyisocyanate I<br>15 parts Capsule Concentrate | 0<br><br>21 | 450<br><br>93,599 | 10/80<br><br>13/100 |

The systems reported in Table VI are prepared using the 4 percent $BF_3$ capsule concentrate of Example 1.

TABLE VI

| Lot | Formulation | Initial Viscosity (cps) | Viscosity of Aged Sample (cps) | Age of Sample (days) | Gel Time of Aged Samples (sec/°C.) |
|---|---|---|---|---|---|
| E | 57 parts Epoxy Resin II<br>11 parts Styrene<br>22 parts Polyisocyanate I<br>10 parts 4% $BF_3$ Capsule Concentrate | 200 | 575 | 7 | 10-15/150 |
| F | 50 parts Epoxy Resin I<br>5 parts Reactive Diluent I<br>30 parts Polyisocyanate I<br>15 parts 4% $BF_3$ Capsule Concentrate | 1,000 | 4,500 | 70 | 35/150 |
| G | 60 parts Epoxy Resin I<br>10 parts Reactive Diluent II<br>10 parts Polyisocyanate I<br>20 parts 4% $BF_3$ Capsule Concentrate | 7,900 | 77,000 | 119 | 46/150 |
| H | 60 parts Epoxy Resin I<br>15 parts Reactive Diluent II<br>10 parts Polyisocyanate I | 6,330 (4 days) | 50,000 | 26 | 8/150 |

TABLE VI-continued

| Lot | Formulation | Initial Viscosity (cps) | Viscosity of Aged Sample (cps) | Age of Sample (days) | Gel Time of Aged Samples (sec/°C.) |
|---|---|---|---|---|---|
| I | 15 parts 4% BF₃ Capsule Concentrate<br>30 parts Epoxy Resin I<br>5 parts Reactive Diluent I<br>50 parts Polyisocyanate I | 1,300<br>(21 days) | 1,750 | 70 | 65/150 |
| J | 15 parts 4% BF₃ Capsule Concentrate<br>57 parts Epoxy Resin I<br>11 parts Trioxane<br>16 parts Polyisocyanate I | 480 | 800 | 1 | 5/80 |
| K | 16 parts 4% BF₃ Capsule Concentrate<br>57 parts Epoxy Resin I<br>11 parts Styrene<br>16 parts Polyisocyanate II | 450 | 810 | 3 | 45/150 |
| L | 16 parts 4% BF₃ Capsule Concentrate<br>57 parts Epoxy Resin IV<br>11 parts Styrene<br>16 parts Polyisocyanate I<br>16 parts 4% BF₃ Capsule Concentrate | 650 | 2,900 | 0.3 | 8/150 |

EXAMPLE 7

Adding a urethane catalyst.

Urethane catalysts can be added to the heat-curable systems in order to facilitate the reaction of the isocyanate and hydroxyl groups therein. Thus, one part of a tin-containing catalyst for the formation of urethane (available from the Witco Chemical Company under the trade designation "Fomrez UL-1") is added to a formulation of 50 parts of epoxy resin I, 25 parts of polyisocyanate I, 15 parts of reactive diluent II and 15 parts of the capsule concentrate of Example 1. This system has an initial viscosity of 1,450 cps, a viscosity of 49,500 cps after 42 days and a gel time of 9 seconds at 150° C.

EXAMPLE 8

Castings from compositions containing reactive diluents.

Formulation 1
    55 parts epoxy resin I
    10 parts styrene
    20 parts polyisocyanate I
    15 parts 4% BF₃ capsule concentrate
    (of Example 1)

Formulation 2
    55 parts epoxy resin I
    10 parts reactive diluent I
    20 parts polyisocyanate I
    15 parts 4% BF₃ capsule concentrate
    (of Example 1)

Castings suitable for use as testing specimens are prepared and cured for 15 minutes at 150° C. The average tensile strength of five samples of formulation 1 is 3,800 psi (266 kg/cm²), and the average elongation at break is 4.7 percent. The average tensile strength of five samples of formulation 2 is 8,516 psi (600 kg/cm²), and the average elongation at break is 7.7 percent.

Useful one-part, curable systems of the invention are also prepared by dispersing the catalyst concentrates of Examples 1-3 (stabilized with suitable scavengers) in cationically polymerizable monomers and/or prepolymers including isobutylene, vinyl carbazole, vinyl isobutyl ether, 2,5-dimethyl-2,4-hexadiene, β-propiolactone, ε-caprolactone, glycolide, para-acetaldehyde, dioxane, aziridine and triphenylphosphite.

What is claimed is:

1. A heat curable, one-part, liquid resin composition comprising
  I. A latent catalyst which comprises rupturable, impermeable microcapsules ranging in size from about 0.1 to 20 microns having
    (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and
    (2) liquid fills comprising a Lewis acid-glycerol complex,
  II. a cationically curable monomer composition, and
  III. a Lewis base scavenger having a pK$_b$ of from about 6 to 11,
there being from 1 to 20 parts of I and 80 to 99 parts of II in the one-part system, the sum of I and II being 100 parts, and there being 0.1 to 35 mole percent of III, based on the moles of Lewis acid in the microcapsules.

2. A heat curable, one-part, liquid resin composition comprising
  I. a latent catalyst which comprises a slurry of
    A. rupturable, impermeable microcapsules ranging in size from about 0.1 to 20 microns having
      (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and
      (2) liquid fills comprising a Lewis acid-glycerol complex, and
    B. a liquid medium selected from aromatic polyisocyanates as defined above and esters of an aromatic carboxylic acid and an alkyl, aralkyl or aryl alcohol, the ester containing up to about 40 carbon atoms,
  II. a cationically curable monomer composition, and
  III. a Lewis base scavenger having a pK$_b$ of from about 6 to 11,
there being from 1 to 40 parts of I and 60 to 99 parts of II in the one-part composition, the sum of I and II being 100 parts, and there being 0.1 to 35 mole percent of III, based on the moles of Lewis acid in the microcapsules.

3. A resin composition according to claim 2 wherein the microcapsule fill material comprises a 20 percent boron trifluoride-glycerol complex and the overall boron trifluoride concentration in the catalyst (I) is 4 weight percent.

4. A resin composition according to claim 3 which contains 2.0–2.5 mole percent of dimethylformamide scavenger, based on the moles of boron trifluoride present.

5. A resin composition according to claim 1 wherein the cationically curable monomer composition is an epoxide resin composition.

6. A resin composition according to claim 5 wherein the epoxide resins have an average epoxide equivalent number of 2.0 or greater.

7. A resin composition according to claim 5 wherein the epoxide resin is a bisphenol A-based epoxy resin.

8. A resin composition according to claim 5 wherein the epoxide resin is a bisphenol A diglycidyl ether resin.

9. A resin composition according to claim 5 wherein the epoxide resin is an epoxy novolak resin.

10. A resin composition according to claim 5 wherein the epoxide resin is a bisphenol F diglycidyl ether resin.

11. A one-part, heat curable composition according to claim 2 containing
   I. a latent catalyst which comprises a slurry of
      A. microcapsules ranging in size from about 1 to 5 microns and
      B. an aromatic polyisocyanate liquid medium,
   II. an epoxy resin composition, and
   III. a Lewis base scavenger having a $pK_b$ of from about 6 to 11,
there being from 5 to 40 parts of I and 60 to 95 parts of II, the sum of I and II being 100 parts, and there being 0.1 to 35 mole percent of III, based on the moles of Lewis acid in the microcapsules.

12. A resin composition according to claim 11 which contains additionally
   IV. 1 to 100 parts of one or more reactive diluents.

13. A resin composition according to claim 2 containing
   I. 10–30 parts of the catalyst slurry,
   II. 70–90 parts of a cationically curable monomer composition consisting of 40–80 parts of bisphenol S diglycidyl ether, 5–30 parts of a polyisocyanate reactive diluent and 5–30 parts of a second reactive diluent, and
   III. a Lewis base scavenger having a $pK_b$ of from about 6 to 11.

* * * * *